United States Patent
Watanabe

(10) Patent No.: US 7,395,087 B2
(45) Date of Patent: Jul. 1, 2008

(54) RADIO RECEIVER AND SIGNAL AMPLIFYING METHOD IN RADIO RECEIVER

(75) Inventor: Hideki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/179,156

(22) Filed: Oct. 26, 1998

(65) Prior Publication Data

US 2001/0041584 A1 Nov. 15, 2001

(30) Foreign Application Priority Data

Apr. 10, 1998 (JP) ................................ 10-099182

(51) Int. Cl.
*H04B 1/16* (2006.01)
*H04B 1/36* (2006.01)
*H04M 1/00* (2006.01)

(52) U.S. Cl. ................................ 455/553.1; 455/552.1

(58) Field of Classification Search ................ 455/552, 455/550, 553, 180.1, 190.1, 78, 82–83, 63, 455/296, 226.3, 341, 142, 426, 552.1, 550.1, 455/553.1, 63.1
See application file for complete search history.

(56) References Cited

U.S. PATENT DOCUMENTS

| | | | |
|---|---|---|---|
| 5,309,502 A * | 5/1994 | Hirai | ........................... 379/59 |
| 5,722,062 A | 2/1998 | Nakanishi et al. | |
| 5,722,063 A | 2/1998 | Peterzell et al. | |
| 5,818,827 A | 10/1998 | Usui et al. | |
| 5,878,087 A | 3/1999 | Ichihara | |
| 5,930,692 A * | 7/1999 | Peterzell et al. | ............. 445/217 |
| 6,069,525 A * | 5/2000 | Sevic et al. | ................... 330/51 |
| 6,222,831 B1 | 4/2001 | Kofune | |

FOREIGN PATENT DOCUMENTS

| | | |
|---|---|---|
| JP | 5-501794 | 4/1993 |
| JP | 7-95122 | 4/1995 |
| JP | 7-336283 | 12/1995 |
| JP | 9-51321 | 2/1997 |
| JP | 9-107299 | 4/1997 |
| JP | 10-271028 | 10/1998 |
| JP | 11-55140 | 2/1999 |
| WO | WO 92/03892 | 3/1992 |

OTHER PUBLICATIONS

Notification of Reason(s) for Rejection dated Oct. 16, 2007, from the corresponding Japanese Application.
Notification of Reasons for Rejection mailed on Aug. 1, 2006.

* cited by examiner

*Primary Examiner*—Naghmeh Mehrpour
(74) *Attorney, Agent, or Firm*—Katten Muchin Rosenman LLP

(57) ABSTRACT

A radio receiver and a method of amplifying a signal in the receiver comprise a receiving system which receives a radio signal according to plural types of radio communication modes. The receiving system is provided with amplifiers adapted for amplifying plural types of received signals to amplify received signals according to the corresponding radio communication modes to carry out an optimal amplifying process of the signal for each radio communication mode. As a result, the power consumption may be reduced.

17 Claims, 10 Drawing Sheets

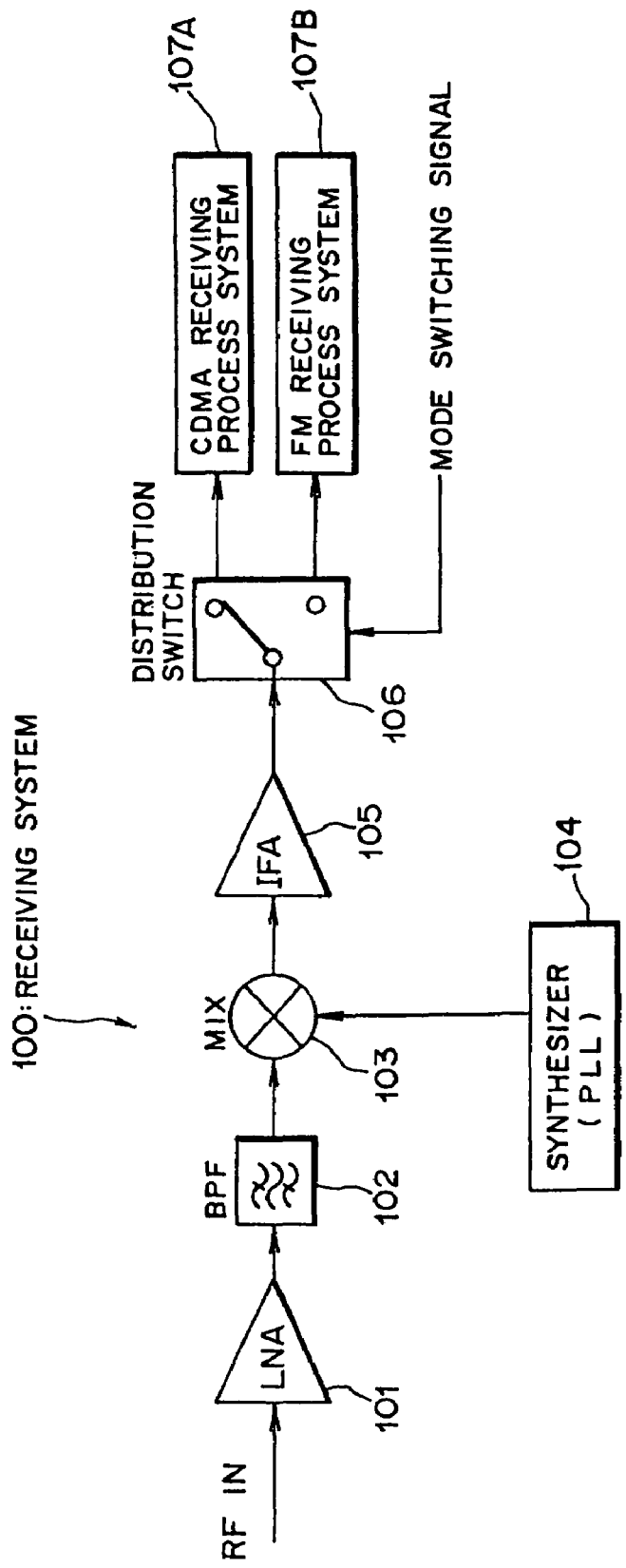

RADIO RECEIVER AND SIGNAL AMPLIFYING METHOD IN RADIO RECEIVER

BACKGROUND OF THE INVENTION (1) Field of the Invention

The present invention relates to a radio receiver and a signal amplifying method in radio receiver and, in particular, to a radio receiver which is capable of receiving the electric waves (radio signals) according to plural types of radio communication modes (systems) and a method of amplifying signals for use in the same.

(2) Description of the Related Art

In the field of the radio communication technique, in particular, the mobile communication technique as in the personal handy phone system, a radio communication system called Frequency Division Multiple Access (FDMA) system has been well known in which the frequency band dealt with by a single base station is divided to be allocated to a plurality of mobile equipment (mobile terminals) so that they may simultaneously make access to the single base station for communication. Incidentally, in this FDMA system, in general, the FM communication adapted system(analog communication system) has been in which the carrier wave is modulated in frequency for transmission.

On the other hand, in recent years, a communication system called Code Division Multiple Access (CDMA) system has been noted. This CDMA system is a digital radio communication system in which a transmitted signal after a primary modulation [desired wave: See FIG. 8(a)] is subjected to a spread spectrum process (secondary modulation) at each mobile terminal by using a different code series to allow the signals (channels) of the same frequency which are transmitted from each mobile terminal to be separated and distinguished from each other, and is also called a Spread Spectrum Multiple Access (SSMA) system because, due to the above-mentioned secondary modulation, the spectrum of the transmitted signal is greatly spread.

This CDMA system (hereinafter referred to simply as "CDMA") has a disadvantage that, because the frequency band covered by the base station is simultaneously occupied by a plurality of mobile terminals, the utilizing factor of the band is very low. However, on the other hand, since the transmitted signal after the spectrum has been spread is low in power density, it has an advantage that the secret function is extremely high, which has found use in the specific applications such as military communication and the like.

However, in recent years, there has been a trend that this CDMA system is proposed as a communication system for the private mobile communication service, and its service has already been under way in some overseas areas such as USA or Korea. Also in Japan, its service is scheduled to put into operation in the very near future. As described above, if the service utilizing the CDMA system is realized, since its coexistence with the service utilizing other existing service such as the FDMA system is required, it is required also of the mobile terminals that they can receive either signals of CDMA and FDMA (FM) system (dual reception mode) while, at the same time, allowing either signals to be appropriately amplified.

To meet such a demand, in order to achieve such a mobile terminal with dual reception mode (hereinafter referred to as dual mode terminal), as illustrated in, for instance, FIG. 9, in a receiving system (receiving front end) 100, at the side of the output of an amplifier (IF amp) 105 for the intermediate frequency (IF) band, a distribution switch 106 is provided to switch 106 its output according to the communication system (CDMA mode or FM mode) of the received signal so that the output of the IF amplifier 105 may be outputted to one of the CDMA receiving (demodulating) process system 107A and the FM receiving (demodulating) process system 107B.

Incidentally, referring to FIG. 9, reference numeral 101 denotes a low noise signal amplifier (LNA) for amplifying the received radio frequency (RF), 102 a bandpass filter (BPF) for removing the noise signal component of the received RF signal, and 103 a mixer (down-converter) for mixing the received RF signal and a signal from a synthesizer (Phase Locked Loop circuit:PLL) 104 to down-convert the received RF signal to the IF signal.

With such a construction, according to the receiving system 100 of the dual mode terminal shown in FIG. 9, the received RF signal is down-converted to the IF signal by means of the mixer 103, and the IF signal, after amplified by the IF amplifier 105, is outputted to either one of the CDMA receiving process system 107A or FM receiving process system 107B because the output of the distribution switch 106 is switched according to the mode switching signal.

In the CDMA receiving process system 107A, the input IF signal is subjected to the spectrum despreading process and the demodulation process for demodulating a receiving signal of CDMA system while, in the FM receiving process system 107B, the input IF signal is subjected to the frequency demodulation process for demodulating a receiving signal of FM system.

Incidentally, the above-mentioned mode switching signal is generated by CPU's (not shown) detection of whether it is in the CDMA service area (receiving the signal from the base station for CDMA)) or in the FM service area (receiving the signal from the base station for FM).

By the way, with such dual mode terminal, if the CDMA service area and the already existing FM service area overlie geographically and in frequency, in view of the CDMA performance, in order to avoid the interference problem which may be caused by the FM service carrier signals, a high "tertiary input intercept point (IIP3)" is required, during the CDMA mode operation, of the receiving front end 100 (to be concrete, IF amplifier 105).

Here, this IIP3 is a parameter showing a suppression degree of the noise signal (tertiary distortion) occurring to a received signal in a radio communication system of its own (CDMA, for example) due to the tertiary harmonic component of a received signal (interference wave signal) in a different radio communication system. Assuming, for instance, that the IF amplifier 105 exhibits an input/output characteristic (straight line 111 with approximately "1" of gradient) as shown in FIG. 10, it can be represented by the input level (dB) of its intersection 113 (IIP3) with the input/output characteristic of the tertiary distortion indicated by the straight line 112 of approximately "3" of gradient.

Inconsequence, in order to achieve the high IIP3, it will be necessary to shift the intersection 113 (straight line 112) of FIG. 10 in the rightward direction of the sheet, i.e., to reduce the generation of the tertiary distortion on the same input level. Why, during the CDMA mode operation, the high IIP3 is required is that, as described above with reference to FIG. 8(b), in the CDMA system, the power density of the spectrum of the transmitted signal is extremely low as compared with that of the FM system and that if the tertiary distortion caused by the tertiary harmonic wave signal of the FM system carrier signal (interference signal) takes place greatly to the frequency area of this spectrum for interference, then the S/N ratio of the CDMA signal can be greatly degraded resulting its abnormal reception.

Therefore, with the receiving front end 100 shown in FIG. 9, the bias current amount of, for example, the IF amplifier 105 is previously adjusted large so as to adapt itself to the CDMA mode so that the point (saturation point) 114 where the linear input/output characteristic of the IF amplifier 105 begins to deteriorate in the form of a curve is shifted in the rightward direction of the sheet (the linear portion is made wider: See sign 114') with the result that the performance of the IF amplifier 105 is improved and the above-mentioned generation of the tertiary distortion is suppressed.

As a result, the foregoing IF amplifier 105, whether it is operating in the CDMA or FM mode, may operate with the bias current amount for the CDMA mode which calls for a high IIP3. However, during the FM mode operation, since it does not call for such a high IIP3, if the IF amplifier 105 is used in common with the CDMA and FM modes, then, as compared with the existing receiving front end dedicated to the FM mode, the current amount consumption can become too much resulting in a great increase of power consumption.

SUMMARY OF THE INVENTION

In view of the foregoing problems, the present invention has been conceived, and its object is to provide a radio receiver and a method of amplifying the signal for use in the same which may amplify the received signal according to plural types of radio communication systems so as to allow the signal of each radio communication systems to be each amplified optimally to thereby achieve reduction of the power consumption.

To this end, the radio receiver according to the present invention comprises a receiving system capable of receiving radio signals according to plural types of radio communication systems while, at the same time, comprising an amplifier within this receiving system which may allow the plural types of received signals to be amplified according to the plural types of radio communication systems.

Therefore, according to the radio receiver of the present invention, since the amplifier is provided to amplify the plural types of received signals according to the plural types of radio communication system in the receiving system, the received signal of each communication system may be individually amplified by an amplifier dedicated to each communication system, so that the signal may be amplified by an amplifier optimal to the amplification of the received signal.

Here, if a selection control portion is provided to select an amplifier which may be used according to the foregoing radio communication system, since only the amplifier necessary to amplify that received signal according to its radio communication system, it may also lend itself greatly to the reduction of the power consumption of this radio receiver.

Further, in another embodiment of this radio receiver, the foregoing receiving system may be provided with an output selection portion for outputting the received signal to either one of the foregoing amplifiers according to the foregoing radio communication systems, and the selection control portion may control the selecting process of this output selection portion according to the radio communication system of the received signal while actuating either one of the foregoing amplifiers.

As a result, according to the present invention, a selective amplification process can be realized with a simple construction according to the radio communication system of the received signal.

Still further, the foregoing output selection portion may be provided on an intermediate frequency stage into which, as the foregoing received signal, the radio signal of intermediate frequency band after the radio signal of the radio frequency band has been down-converted is entered so that the foregoing amplifiers may be served as those for the intermediate frequency band which may amplify the radio signal of the intermediate frequency band.

In consequence, since at least the radio frequency stage may be shared in common with each radio communication system, it becomes possible to realize miniaturization of this radio receiver.

Further, if the foregoing plural types of radio communication systems comprise a first and second communication systems whose permissible noise signal levels differ from each other (the noise signal may arise to the received signal of its own radio communication system due to that of a different radio communication system), then, as the foregoing plural types of amplifiers, there may be provided a first amplifier adapted for the first communication system and a second amplifier adapted for the second communication system to which respective bias current amounts are set so as to achieve the operating condition each meeting the foregoing permissible level, while the foregoing output selection portion may be constructed as a distribution switch for distributing the received signal to one of the first and second amplifiers, and the foregoing selection control portion may be constructed as a switching control portion so that, according to the radio communication system of the received signal, the output of this distribution switch is switched to one of the first and second amplifiers and corresponding one of the first and second amplifiers is actuated.

As a result, since the received signal can be amplified by actuating only the amplifier provided with an operating condition (bias current amount) optimal to the foregoing each communication system, the power consumption of the receiver can be reduced more by the reduction of current consumption of the amplifiers.

Incidentally, the foregoing switching control portion may be provided with a communication system detecting portion which detects whether the radio communication system of the received signal is the first or second, and if the first communication system is detected by this communication system detecting portion, then the output of the distribution switch is switched to the first amplifier side to actuate the first amplifier while, if the second communication system is detected, then the output of the distribution switch is switched to the second amplifier side to actuate the second amplifier.

As a result, since the foregoing switching control portion can automatically control the switching of the amplifier actuated according to the detection result of the communication system detecting portion, it may lend itself greatly to the improvement of the usability of this radio receiver.

Here, especially if the foregoing second communication system is the analog radio communication system utilizing a desired modulation system and the foregoing first communication system is the digital radio communication system utilizing a spread spectrum system which is lower in the permissible level of noise signal than the analog radio communication system, since the received signal can be amplified by the operating condition (bias current amount) optimal to the respective modes, the power consumption can greatly be reduced as compared with a case in which the amplifiers are shared in common with each communication system to adjust their bias current amount greatly so as to coincide with the digital communication which is low in the permissible level of noise signal.

Next, the radio receiver according to the present invention is provided with a receiving system capable of receiving the radio signals according to plural types of radio communication systems, and this receiving system includes an amplifier for amplifying a received signal which is shared in common between the foregoing radio communication systems and a control portion for altering the operating condition of this amplifier to that according to the radio communication system of the received signal.

Therefore, according to the radio receiver of the invention, since the amplifier shared in common with the foregoing radio communication systems is provided to amplify the received signal and the control portion is provided to alter this operating condition into that corresponding to the radio communication system of the received signal, there is no need to provide a plurality of amplifiers according to each radio communication system with the result that the entire receiver can be simplified, on one hand, and the amplifier can be actuated under the operating condition optimal to each radio communication system, on the other, to amplify the received signal.

In this case, if the foregoing control portion is constructed as a bias change control portion for changing the foregoing operating condition by changing the bias current amount of the amplifier according to the radio communication system of the received signal, since the amplifier can be actuated by the bias current amount optimal to each radio communication system, the power consumption of the receiver can be greatly reduced.

In addition, if the foregoing plural types of radio communication systems comprise the first and second communication systems whose noise signal permissible levels differ from each other and the received signal of either one system causes the noise signal to that of the other radio communication system, then it may be also constructed so that the bias change control portion may change the bias current amount of the amplifier between the first current amount for the first communication system and the second current amount for the second communication system according to the radio communication system of the received signal so that the operating conditions of the amplifiers may each satisfy the foregoing permissible levels. Thus, with a simple construction, it becomes possible to achieve the change control of the operating condition of the amplifier according to the radio communication system of the received signal.

Incidentally, the foregoing bias change control portion may also be constructed so that it is provided with a communication system detecting a portion which detects whether the communication system of the received signal is the first or second, and if the first is detected by this detecting portion the bias current amount of the amplifier may be changed into the first current amount while if the second is detected the bias current amount of the amplifier may be changed into the second current amount.

As a result, since the foregoing bias change control portion can carry out the change control of the operating condition (bias current amount) of the amplifier automatically according to the result of detection by the detecting portion, it may lend itself greatly to the improvement of the usability of this radio receiver.

Further, if the foregoing amplifier is constructed as one adapted for intermediate frequency band which may amplify a radio signal of intermediate frequency band after the radio signal of radio frequency band has been down-converted as the received signal, since the amplifier can be shared in common with each radio communication system from the radio frequency stage up to the amplifier for intermediate frequency band, this radio receiver can further be miniaturized.

Still further, if the second communication system is the analog radio communication one utilizing a desired modulation system and the first communication system is the digital radio communication one utilizing the spread spectrum system, which is lower in the permissible level of noise signal than the former, the received signal can be amplified under the operating condition (the first current amount>the second current amount) optimal to the digital as well as analog radio communication system, which allows the power consumption to be greatly reduced as compared with a case the amplifier is shared in common with each communication system with its bias current amount staying adjusted with a large margin in tune with the digital communication system of low permissible noise signal level.

Next, the signal amplifying method according to the present invention is characterized in that a radio receiver which may receive a radio signal according to the plural types of radio communication systems may select one of the plural types of amplifiers according to the radio communication systems of the received signal to amplify the received signal.

In consequence, according to the method of amplifying signals of the present invention, since the radio receiver which can receive the radio signal according to the plural types of radio communication systems can select one of the plural types of amplifiers according to the radio communication system of the received signal to amplify the received signal, the received signal of each communication system can amplify individually by means of an amplifier each dedicated to each communication system with the result that the signal can always be amplified by means of an amplifier optimal to the amplification of the received signal. Further, in this case, since only the amplifier necessary to amplify that received signal is selected and used according to the radio communication system of the received signal; it may lend itself greatly to the reduction of the power consumption of this radio receiver.

Further, the signal amplifying method according to the present invention is characterized in that a radio receiver which can receive a radio signal according to the plural types of radio communication systems may change the operating condition of an amplifier for amplifying the received signal into one according to a radio communication system of the received signal to amplify the received signal with the result that there is no need to provide the plural types of amplifiers each corresponding to each radio communication system, so that while the entire apparatus may be simplified the amplifier can always be actuated under the operating condition optimal to each radio communication system to amplify the received signal.

BRIEF DESCRIPTION OF THE DRAWINGS

FIG. 9 is a block diagram illustrating a receiving system of a dual mode terminal (portable radio mobile terminal)

DESCRIPTION OF THE PREFERRED EMBODIMENTS

A few embodiments of the present invention are hereinafter described with reference to the accompanying drawings.

(A) Description of the First Embodiment

Figure 1:
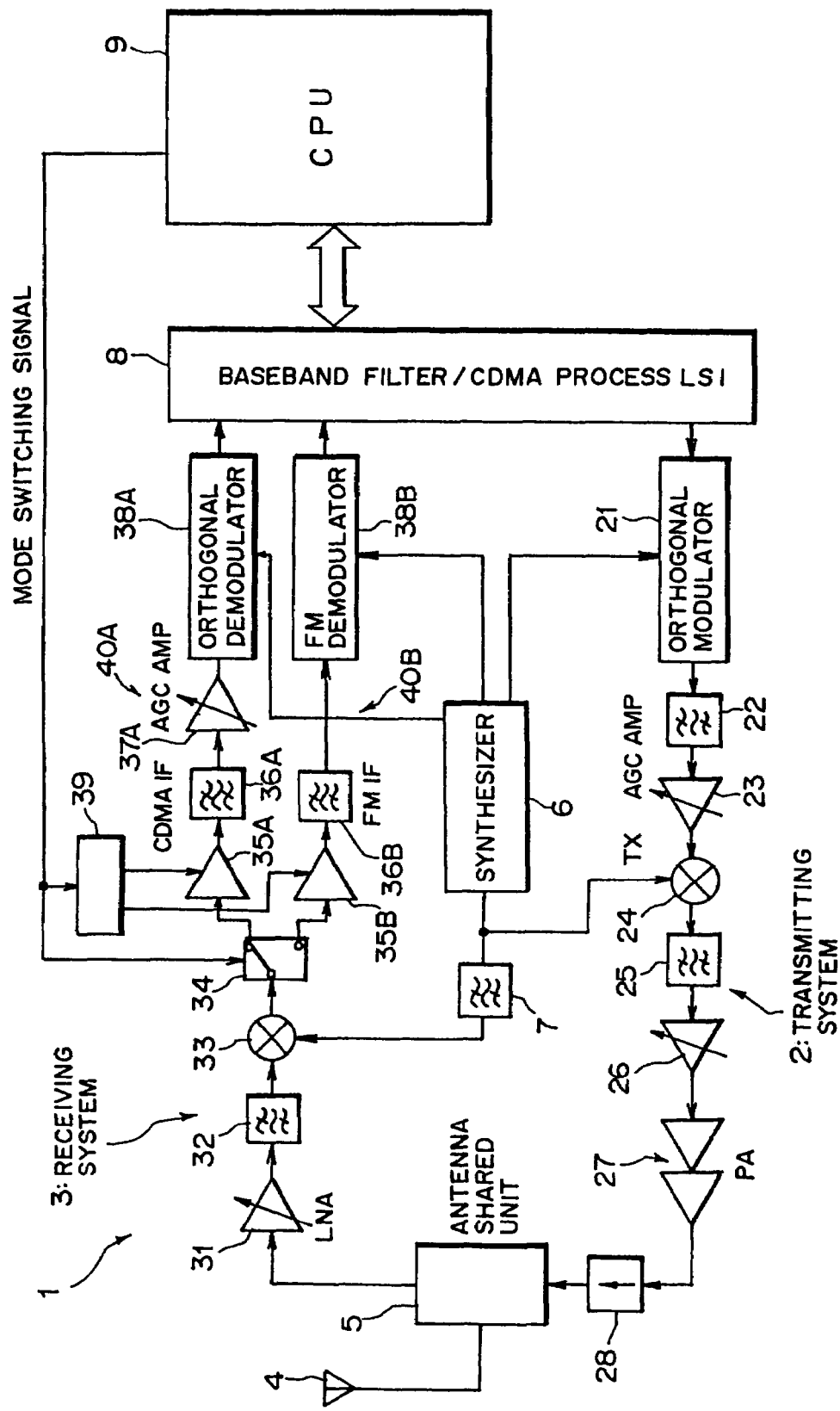
FIG. 1 is a block diagram illustrating a construction of a portable radio mobile terminal (radio receiver) according to a first embodiment of the invention.

FIG. 1 is a block diagram illustrating a construction of a portable radio mobile terminal (radio receiver) according to a first embodiment of the invention, in which a portable radio mobile terminal 1 is constructed as a dual mode terminal which may be used in either of the service areas for a CDMA system [first communication system (digital radio communication system utilizing the spread spectrum system)] and an FDMA system [second communication system (analog radio communication system)]. The portable radio mobile terminal 1, as shown in FIG. 1, is provided with a transmitting system 2 and a receiving system 3, and a single antenna 4 is shared in common between the transmitting system 2 and the receiving system 3 by means of an antenna shared unit 5. Incidentally, in this FIG. 1, reference numeral 6 denotes a synthesizer, 7 a bandpass filter (BPF), 8 a large-scale integrated circuit (LSI) and 9 a central processing unit (CPU), whose functions will be described later.

As shown in FIG. 1, the transmitting system 2 is provided with an orthogonal modulator 21, bandpass filters 22 and 25, automatic gain control (AGC) amplifiers 23 and 26, a mixer (up-converter) 24, a power amplifier (PA) 27, an isolator 28 and the like while the receiving system 3 is provided with a low noise signal amplifier (LNA) 31, a bandpass filter (BPF) 32, a mixer (down-converter) 33, a switch 34, a CDMA demodulating process system 40A, an FM demodulating process system 40B and the like.

Here, in the transmitting system 2, the orthogonal modulator 21 subjects a transmission baseband (BB) signal processed by the LSI 8, which is subjected to the spreading process (primary modulation) during the CDMA mode, to an orthogonal modulating process (here, for instance, quadriphase phase shift keying (QPSK)) by means of a carrier signal of intermediate frequency (IF) band produced by a synthesizer [PLL (phase locked loop) circuit] 6 to achieve a transmission IF signal, and BPF 22 is provided for passing through only the frequency component to be transmitted from among those of the transmission IF signal which is obtained through the orthogonal modulator 21 to remove the unnecessary components such as noise signal or the like.

Further, the AGC amplifier 23 amplifies the transmission IF signal passing through the BPF 22 to a desired signal level. In this embodiment, since the distance between the terminal and a base station (not shown) can be known to some extent based on the level of a received signal during the CDMA mode which will be described later, its gain may automatically be controlled to optimum by means of, for instance, CPU 9 so that, depending on that distance, the transmission power may become as minimal possible as necessary. Incidentally, the AGC amplifier 26 is similar in construction to the AGC amplifier 23, and takes a two-stage construction so that, the transmitting system 2 can secure a required dynamic range (for instance, 60 dB).

Still further, the mixer 24 mixes the IF signal from the AGC amplifier 23 and the carrier signal of radio frequency (RF) band which is produced by the PLL circuit 6 to thereby up-convert the transmission IF signal into the transmission RF signal for frequency conversion. The BPF 25 is provided for passing through only the frequency component to be transmitted from among those of the transmitted RF signal to remove the unnecessary components such as noise signal or the like.

The power amplifier 27 amplifies the RF signal from the AGC amplifier 26 to a desired signal level, and the isolator 28 is a directional coupler having a performance to pass through the signal only in one direction, which may be used to prevent the reflected component of the transmitted RF signal or the RF signal component received by the antenna 4 from being fed back to the transmitting system 2.

On the other hand, in the receiving system 3 (hereinafter, sometimes referred to as a receiving front end 3), LNA 31 may amplify the radio wave (radio signal) from the base station, which is received through the antenna 4 and the antenna shared unit 5, with a low noise signal, and, here, a variable gain type is used so that, during the CDMA system, its gain may be controlled to optimum according to the level of the received signal, as described above.

In addition, BPF 32 is provided for passing through only the frequency component to be received from among those of the radio signal (received RF signal) from the LNA 31, and the mixer 33 is provided for mixing the received RF signal passing through the BPF 32 and the carrier wave signal of IF band which has been produced by the PLL circuit 6 and which has been eliminated of the unnecessary component such as noise signal by the BPF 7 to thereby change the received RF signal into the received IF signal in frequency (down-convert).

Further, the switch (output selection portion, distributor switch) 34 outputs the received IF signal obtained by this mixer 33 to one of the CDMA demodulating process system 40A and the FM demodulating process system 40B selectively depending on the communication system of that signal (here, CDMA system or FM (FDMA) system) and, in this embodiment, as will be described later, the communication system of the received signal is automatically detected by the CPU 9 and a mode (CDMA or FM mode) switching signal corresponding to that detection result may be fed so as to switch that output.

Incidentally, in this embodiment, as described above, the switch 34 is provided at the IF stage to which an IF band radio signal after the RF band radio signal is down-converted by the mixer 33 as the received signal is inputted, so that the previous stage (RF stage) of the switch 34 may be shared in common with each radio communication system (CDMA and FM systems).

Further, the CDMA demodulating process system 40A is provided for subjecting the received IF signal inputted through the switch 34 during the CDMA system to a demodulating process, and comprises, for example, a CDMA IF amplifier 35A, a BPF 36A, an AGC amplifier 37A and an orthogonal demodulator 38A. The FM demodulating process system 40B is provided for subjecting the received IF signal inputted through the switch 34 during the FM mode to the demodulating process, and comprises, for example, an FM IF amplifier 35B, a BPF 36B and an FM demodulator 38B.

In the CDMA demodulating process system 40A, a CDMA IF amplifier (first amplifier) 35A is for the IF band to amplify the received IF signal inputted through the switch 34 and, here, it is actuated by being supplied (applied) with a power supply (voltage) from a power switching circuit 39 synchronously with the foregoing mode switching signal during CDMA mode.

The BPF 36A is provided for passing through only the frequency component to be received from among the IF signal components from the CDMA IF amplifier 35A to eliminate the unnecessary components such as noise signal or the like. The AGC amplifier 37A is provided for amplifying the received IF signal passing through this BPF 36A to a desired signal level, in which its gain may automatically be controlled to optimum so that, as in the foregoing AGC amplifier 23, its received power may become as minimal possible as necessary depending on the distance from the base station.

Further, the orthogonal demodulator 38A is provided for, based on the carrier wave of IF band generated by the PLL circuit 6, subjecting an orthogonal demodulating process (QPSK demodulating process) to the received IF signal from this AGC amplifier 37A to obtain a demodulated BB signal, and the demodulated BB signal thus obtained under the CDMA system is subjected to desired processes such as A/D (analog/digital) conversion process, filtering process, despread (inverse dispersion) process or the like by means of LSI 8.

On the other hand, in the FM demodulating system 40B, the FM IF amplifier (second amplifier) 35B is an amplifier for IF band for amplifying the received IF signal inputted through the switch 34, and operates, as in the CDMA IF amplifier 35A, by being supplied (applied) with the power supply (voltage) from the power switching circuit 39 synchronously with the foregoing mode switching signal during FM mode.

Figure 2:
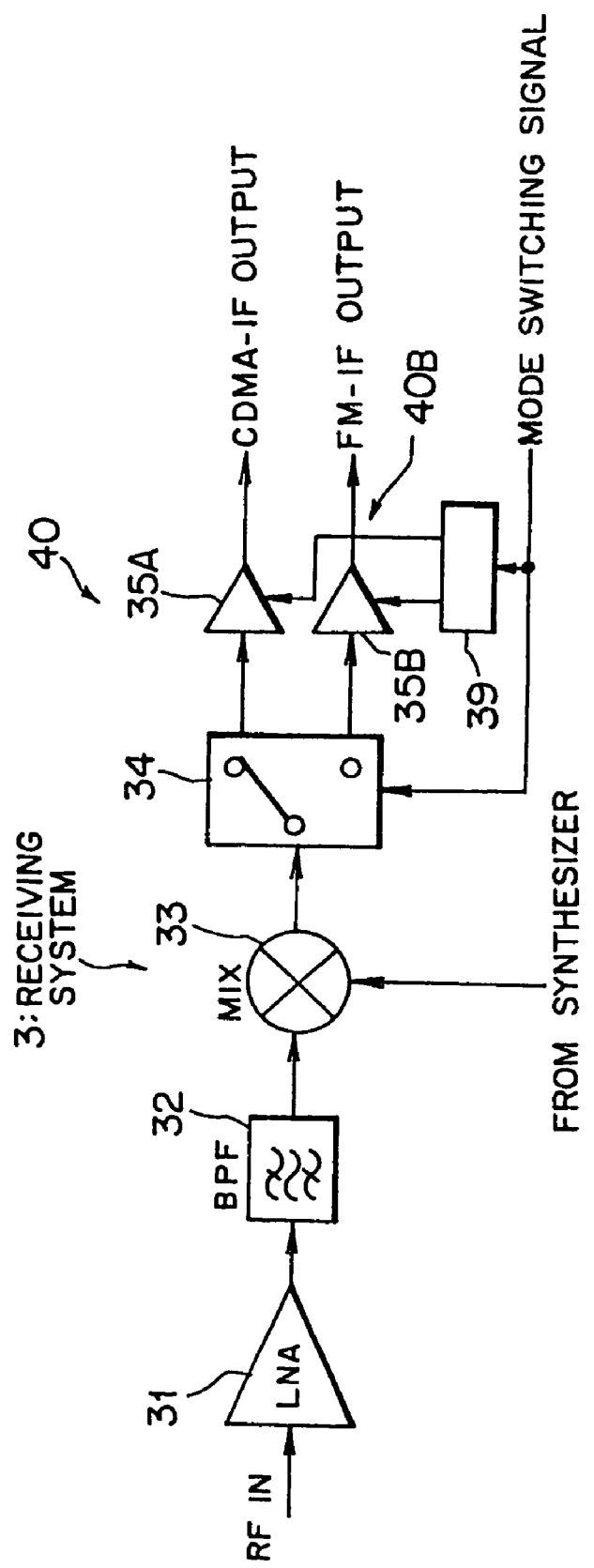
FIG. 2 is a block diagram illustrating a construction of the foregoing embodiment of the portable radio mobile terminal with special attention focused on the receiving system thereof.

That is, the portable radio mobile terminal 1 according to this embodiment (hereinafter, sometimes referred to simply as "terminal 1" or "dual mode terminal 1"), when the receiving front end 3 is noted, is constructed as shown in FIG. 2, and this receiving front end 3 is provided with amplifiers 35A, 35B for amplifying plural types of received signals according to the plural types of radio communication systems (CDMA and FM systems).

Further, BPF 36B is provided for passing through only the frequency components to be received from among those of the IF signal received from the FM IF amplifier 35B to remove the unnecessary components such as noise signal or the like, and the FM demodulator 38B is provided for subjecting the IF signal received from the AGC amplifier 37A to an orthogonal demodulating process (QPSK demodulating process) based on the carrier signal of IF band which is produced by the PLL circuit 6 to obtain a demodulated BB signal, which is subjected to a desired process such as a filtering process by means of the LSI 8.

The CPU 9, as described above, controls each process at the transmitting system 2 and the receiving system 3 on a centralized basis, but in this embodiment, also serves as a selection control portion (switching control portion) for selecting the used IF amplifier 35A or 35B (switches the output of the switch 34 to one of the IF amplifiers 35A and 35B and actuating corresponding one of the IF amplifiers 35A and 35B) according to the radio communication system of the received signal (CDMA and FM systems).

To be concrete, during CDMA mode, it switches the output of the switch 34 to the IF amplifier 35A side and controls the power switching circuit 39 to actuate the IF amplifier 35A while, during FM mode, switching the output of the switch 34 to the IF amplifier 35B side and controls the power switching circuit 39 to actuate the IF amplifier 35B.

Incidentally, the foregoing CDMA and FM modes may be discriminated, as will be described later, depending on whether the signal from the base station for CDMA or the signal from the base station for FM is received. That is, this CPU 9 also serves as a communication system detecting portion which detects which one of the CDMA and FM systems the radio communication system of the received signal is. However, in this embodiment, if the access to the CDMA channel is succeeded even under the waiting state during the FM mode, then it shifts automatically to the CDMA mode (CDMA mode has priority).

By the way, in the foregoing CDMA IF amplifier 35A and FM IF amplifier 35B, as described above, since the permissible levels of noise signal (IIP3) which may arise to the received signal due to the interference wave signal differ between the CDMA and FM systems, this embodiment is designed to optimum so as to meet the IIP3 in each system (mode).

Figure 10:
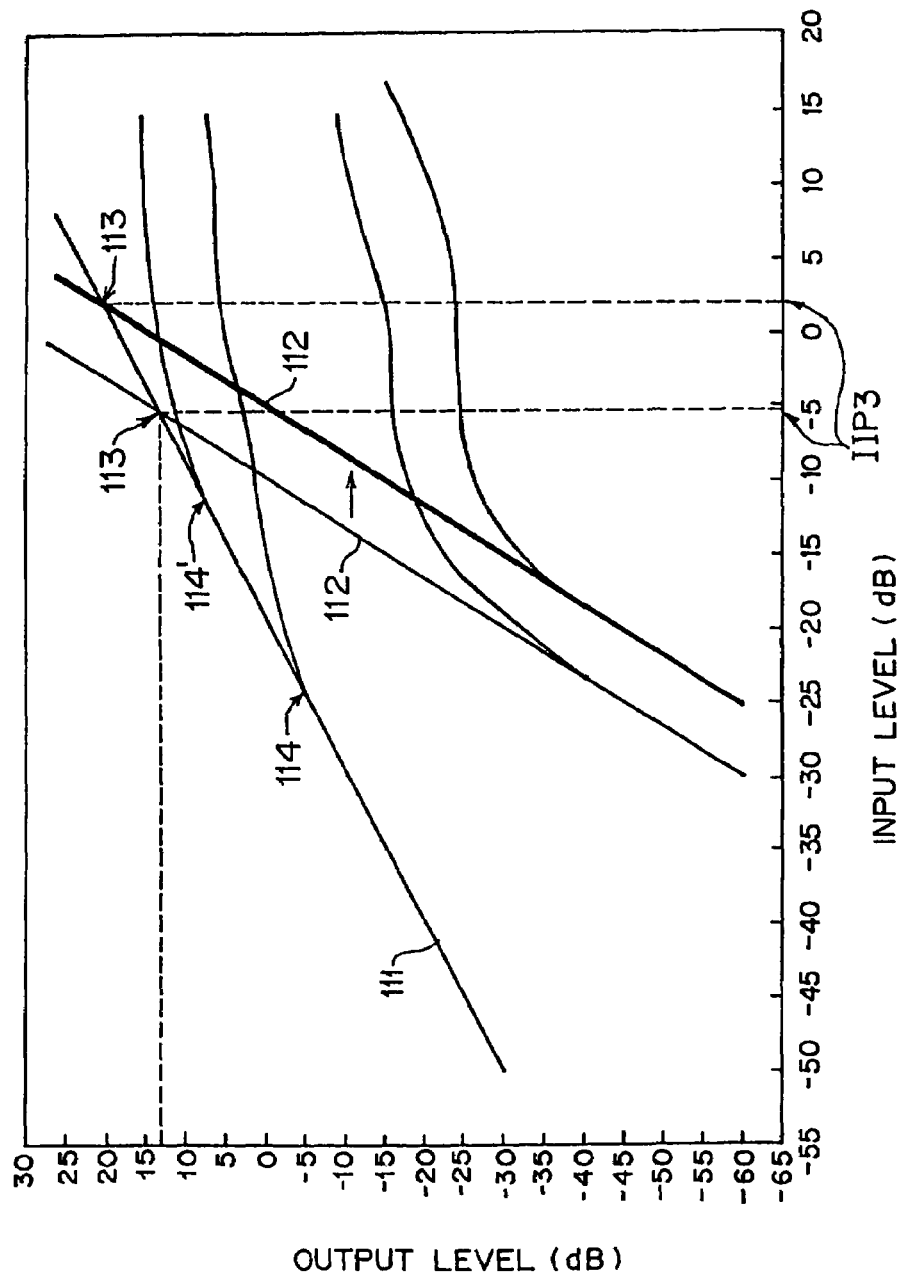
FIG. 10 is a view illustrating an example of the input/output characteristics of the IF amplifier for explaining an IIP3.

That is, since the IIP3 required in CDMA mode is higher than that required in FM system (that is, the CDMA system is lower in the permissible level of noise signal which is caused by the FM system received signal which serves as the interference wave signal), in the CDMA IF amplifier 35A, as previously described in FIG. 10, the bias current amount when the CDMA IF amplifier 35A operates is adjusted (set) so that it becomes greater than the bias current amount when the FM IF amplifier 35B operates to shift the straight line 112 in the rightward direction of the sheet from the point of the input/output characteristics of the IF amplifier 35A so that the operating condition may meet the IIP3.

Figure 3:
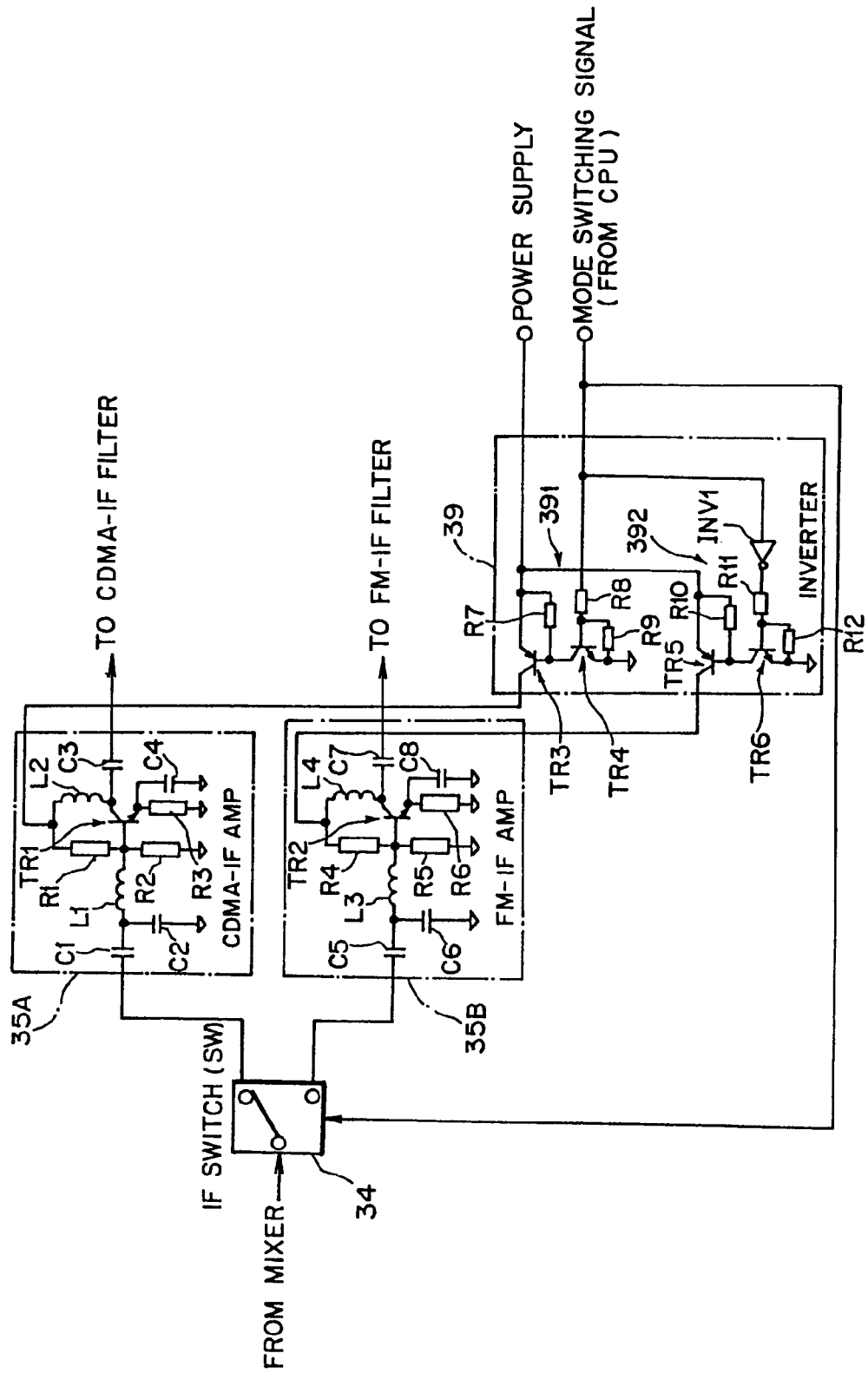
FIG. 3 is a circuit diagram schematically illustrating a detailed construction of a CDMA IF amplifier, FM IF amplifier and a power supply switching circuit.

Here, although the method of adjusting the bias current amount is not specifically called into question, as shown in, for example, FIG. 3, when the IF amplifier 35A is constructed with a bipolar transistor TR1, resistances R1 to R3, capacitors C1 to C4 and coils L1 and L2, while the IF amplifier 35B is constructed with a bipolar transistor TR2, resistances R4 to R6, capacitors C5 to C8 and coils L3 and L4, it may be conceived that the resistance value r3 of the resistance R3 which is connected to the emitter of the bipolar transistor (hereinafter referred to simply as a "transistor") TR1 is made smaller than the resistance value r6 of the resistance R6 which is connected to the emitter of the transistor TR2. However, in this case, let us assume that the devices other than the resistances R3 and R6 are each the same with the IF amplifier 35A and IF amplifier 35B.

Thus, if the same voltage value is respectively supplied to the collector of the transistors TR1 and TR2, then the current amount flowing through the emitter of the transistor TR1 becomes greater than the current amount flowing through the emitter of the transistor TR2, and the bias current amount of the CDMA IF amplifier 35A becomes greater than that of the FM IF amplifier 35B. That is, a different current amount is set to each IF amplifier 35A and 35B so as to achieve the operating condition that meet the IIP3 required of each system.

Incidentally, the power switching circuit 39, as shown in FIG., 3, is provided with a switch 391 using the transistors TR3, TR4 and the resistances R7 to R9, and a switch 392 using an inverter INV1, transistor TR5, TR6 and the resistances R10 to R12 to achieve a function to switch power supply to each IF amplifier 35A or 35B. For instance, if the mode switching signal from CPU 9 turns into H level (CDMA mode), then the transistor TR4 operates and, accordingly, the transistor TR3 operates to supply the voltage of power supply to the CDMA IF amplifier 35A. Incidentally, at this time, since the mode switching signal of H level is inverted into L level by the inverter INV1, neither of the transistors TR5 and TR6 of the switch 392 operate, and no voltage is supplied to the FM IF amplifier 35B (the FM amplifier 35B is in unoperative condition).

Conversely, if the mode switching signal from CPU 9 turns into L level (FM mode), then the transistor TR6 of the switch 392 operates, and accordingly, the transistor TR5 operates, and the voltage of the power supply is supplied to the FM IF amplifier 35B. At this time, since the mode switching signal of L level is inputted to the switch 391 as it is, neither of the transistors TR3 and TR4 operate, and no voltage is supplied to the CDMA IF amplifier 35A (the CDMA IF amplifier 35A is in the unoperative condition).

Figure 4:
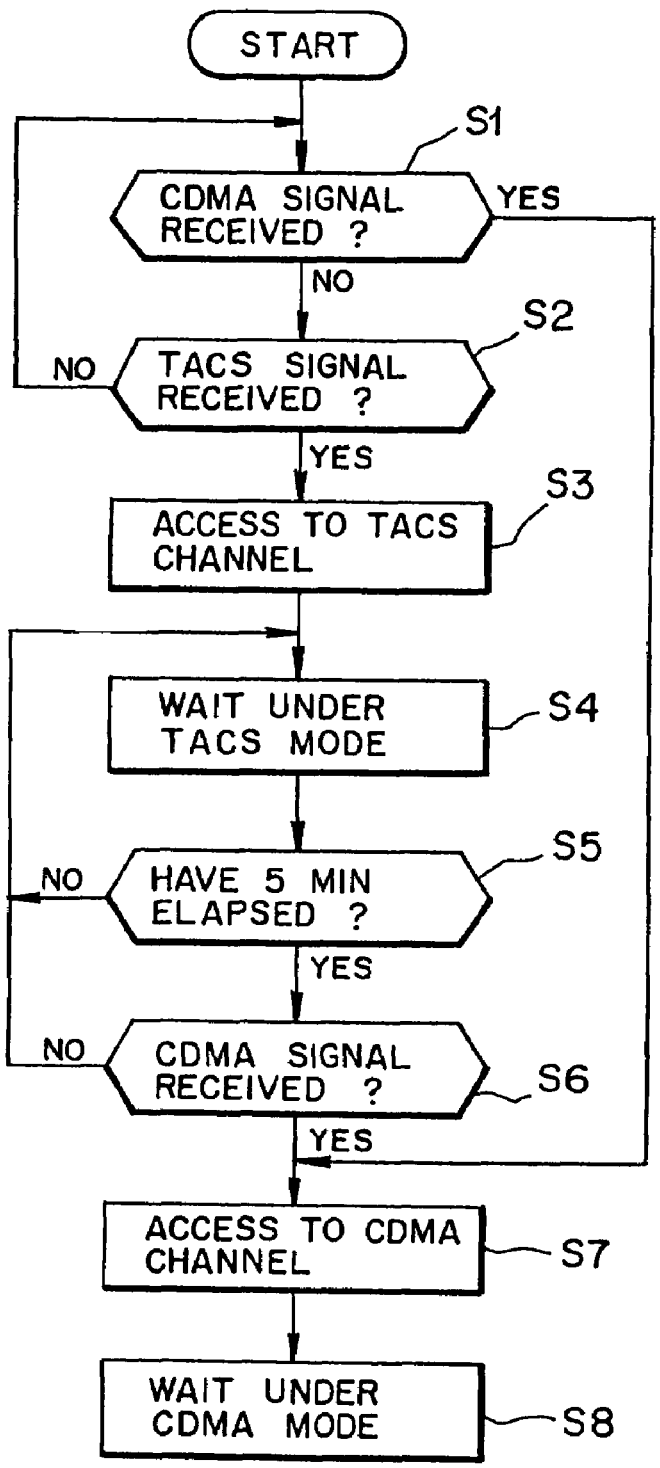
FIG. 4 is a flowchart for explaining an operation of the portable radio mobile terminal according to the first embodiment.

The operation of the dual mode terminal 1 according to this embodiment is hereinafter described in detail with reference to the flowchart (steps S1 to S8) shown in FIG. 4. However, hereinafter, the FM system area is described taking a service area provided by a system called TACS (Total Access Communication System) by way of example.

First, if the terminal 1 is turned on, the CPU 9 (a portion for detecting the communication system) determines whether it is receiving a radio signal from the CDMA base station or not, that is, whether the terminal 1 is encompassed within the CDMA system area or not (step S1). As a result, if the terminal 1 is not encompassed within the CDMA service area (if it was determined NO in step S1), then the CPU 9 in turn determines whether the terminal 1 is receiving a radio signal from the TACS (FM) base station (the terminal 1 is encompassed within the TACS service area) or not (Step S2).

As a result, if the terminal 1 is not encompassed within the TACS service area (if it is determined NO in Step S2), then the CPU 9 determines again whether it is encompassed within the CDMA service area or not, and the foregoing determination process will be repeated until the reception of either one signal of CDMA and TACS can be detected (In the meantime, the terminal 1 is in the so-called "out-of-sphere" state) For instance, if the reception of the TACS signal is detected (if it is determined YES in Step S2), then the CPU 9 makes access to the TACS base station through the transmitting system 2 to have its required information such as its (terminal 1's) telephone number information or peculiar identification information registered to the base station (Step S3) to turn into the waiting state under the TACS system (Step S4).

At this time, the CPU 9 has produced the mode switching signal for the TACS mode (here, L level), and this mode switching signal is supplied to the switch 34 and the power switching circuit 39 of the receiving system 3. As a result, the output of the switch 34 is switched to the FM demodulating process system 40B side while the transistors TR5 and TR6 of the power switching circuit 39 operate, and the power voltage is supplied to the FM IF amplifier 35B of the FM IF amplifier 35B (the CDMA IF amplifier 35A is in the unoperative condition).

As a result, in this dual mode terminal 1, when it receives the TACS communication signal, the FM amplifier 35B operates under the operating condition optimal to amplify that signal.

Incidentally, the CPU 9, after the waiting state under the TACS mode has been achieved, as described above, monitors whether, for example, five minutes have elapsed or not (Step S5), and if not, (if it is determined NO in Step 5), then it maintains the waiting state under the TACS mode while, if five minutes have elapsed (if it is determined YES in Step S5), it is determined again whether the terminal 1 is encompassed within the CDMA service area or not (Step S6).

As a result, if the terminal 1 is not encompassed within the CDMA service area (if it is determined NO in Step S6), then the CPU 9 maintains the waiting state under the TACS mode while, if it is encompassed within the CDMA service area (if it is determined YES in Step S6), then it makes access to the CDMA base station through the transmitting system 2 to have the required information such as its own (terminal 1's) telephone number and the like registered to the base station (Step S7) to achieve the waiting state under the CDMA mode (Step S8).

That is, the dual mode terminal 1 according to this embodiment, even with the waiting state under the TACS mode, confirms on a regular basis (here, every five minutes) whether it is encompassed within the CDMA service area or not, and if it is within the CDMA service area, then it gives priority to the CDMA mode automatically to achieve the waiting state under the CDMA mode.

Incidentally, at this time, the CPU 9 produces the mode switching signal for CDMA mode (H level), which is supplied to the switch 34 and the power switching circuit 39 of the receiving system 3. As a result, the output of the switch 34 is switched to the CDMA demodulating process system 40A side while the transistors TR3 and TR4 of the power switching circuit 39 operate, and the power voltage supplied to the CDMA IF amplifier 35A of the CDMA demodulating process system 40A, and the CDMA IF amplifier 35A operates (The FM IF amplifier 35B is in the non-operative state).

As a result, if this dual mode terminal 1 receives a CDMA communication signal, the CDMA IF amplifier 35A will operate under the operating condition optimal to amplify that signal. That is, this dual mode terminal 1 selects one of the plural types of amplifiers 35A and 35B according to the radio communication system of the received signal, and by using the selected one, amplifies the received signal.

Incidentally, after the terminal 1 is turned on, if it detects reception of the signal from the CDMA base station (if it is determined YES in Step S1) at first, the CPU 9 carries out the processes of Steps S7 and S8 to turn into the waiting state under the CDMA mode.

As described above, in the dual mode terminal 1 according to this first embodiment, since the plural types of amplifiers 35A and 35B according to the plural types of communication systems (CDMA, TACS (FM)) are provided at the receiving front end 3, the received signal of each communication system can be individually amplified by the amplifiers 35A, 35B each dedicated to each communication system to thereby amplify the signal with either one of the amplifiers 35A and 35B optimal to amplify the received signal.

In this embodiment, since only the amplifier 35A or 35B necessary for amplifying that received signal is selected and used (operates) according to the mode switching signal from the CPU 9 which may be generated according to the radio communication system of the received signal, it may lend itself greatly to the reduction of the power consumption of the terminal 1.

To be concrete, the switch 34 is controlled according to the mode switching signal from the CPU 9 while actuating either one of the amplifiers 35A and 35B with the result that a simple construction allows the selective amplification process according to the radio communication system of the received signal to be realized.

In particular, in this embodiment, since the CDMA IF amplifier 35A and the FM IF amplifier 35B are each set in bias current amount so that they may each achieve the operating condition to meet the different IIP3 (The CDMA system is higher in IIP3 than the TACS system) according to the CDMA and TACS systems, the received signal can be amplified under the operating condition (bias current amount) optimal to each TACS or CDMA communication system. Therefore, as shown in, for example, FIG. 9, the power consumption can be greatly reduced as compared with a case in which the amplifier 105 is shared with each communication system to make its bias current amount great in accordance with the CDMA system having a high IIP3.

Further, in this embodiment, since the switch 34 is provided at the IF stage of the receiving front end 3 and the amplifiers 35A and 35B are each constructed as the IF amplifiers 35A and 35B for IF band, at least the RF stage is shared in common between the CDMA and FM systems, so that the terminal 1 can be further made smaller.

Still further, in this embodiment, when the terminal 1 is turned on, the CPU 9 detects which one of the CDMA and TACS systems the radio communication system is, and according to its detection result, a mode switching signal is generated to supply to the switch 34 and the power switching circuit 39 to automatically control switching the IF amplifiers 35A or 35B with the result that it can lend itself greatly to the improvement of usability of the terminal 1.

Incidentally, in the foregoing embodiment, although a case in which two types of communication systems (CDMA and TACS (FM)) are applied as the plural types of radio communication systems was described, the present invention is not necessarily restricted to that, but may also be applied to other systems (for instance, TDMA [Time Division Multiple Access] system or the like), and further, three or more types of radio communication systems may also be applied.

Further, in the foregoing embodiment, although, with the switch 34 provided at the IF stage, the RF stage is shared in common between each communication system, and the stages following the IF stage take a plural system for each communication system, instead, the stages down from the RF stage may take the same system (A plurality of LNAs 31 may be provided for each communication system). However, in this case, since the circuit size is increased, it is not suitable to apply to the portable radio mobile terminal 1.

Further, although, in the foregoing embodiment, the switch 34 is provided at the previous stage of each IF amplifier 35A and 35B to select the received signal according to each communication system at the previous stage of the IF amplifier 35A and 35B, it is also possible to, for instance, provide the switch 34 at the subsequent stage of each IF amplifier 35A and 35B to select the received signal at the subsequent stage of the IF amplifier 35A and 35B according to each communication system. However, in this case, since each IF amplifier 35A and 35B must be actuated, from the point of power consumption, it is not suitable to apply to the portable radio mobile terminal 1.

Further, in the foregoing embodiment, when the terminal is turned on, the CPU 9 discriminates between the CDMA and TACS modes for automatic switching, but this switching can also be manually made by users. Still further, although, as described with reference to FIG. 4, the terminal 1 according to this embodiment is constructed to gives priority to the detection of the received signal of CDMA system, it may of course be constructed to take priority to the detection of reception of the TACS system signal.

(B) Description of the Second Embodiment

Figure 5:
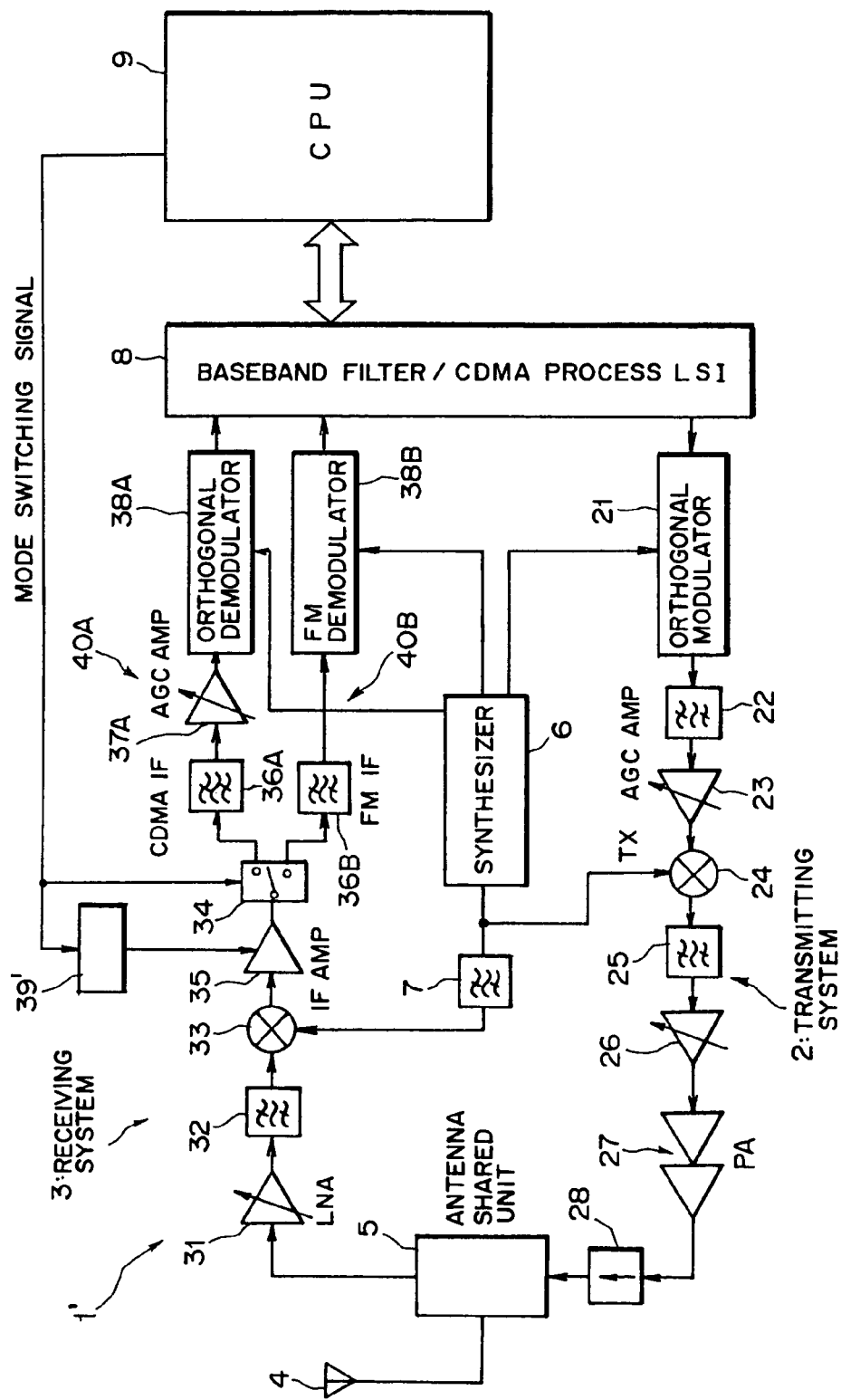
FIG. 5 is a block diagram illustrating a construction of the portable radio mobile terminal (radio receiver) according to a second embodiment of the invention.

FIG. 5 is a block diagram illustrating a construction of the portable radio mobile terminal (radio receiver) according to a second embodiment of the invention, in which a portable radio mobile terminal 1' differs from the terminal 1 of FIG. 1 in that an IF amplifier 35 common to the CDMA and FM (TACS) systems is provided at the rear stage of a mixer 33 while a switch 34 is provided at the rear stage of the IF amplifier 35 and that, in place of the power switching circuit 39, a bias adjusting circuit 39' is provided.

Figure 6:
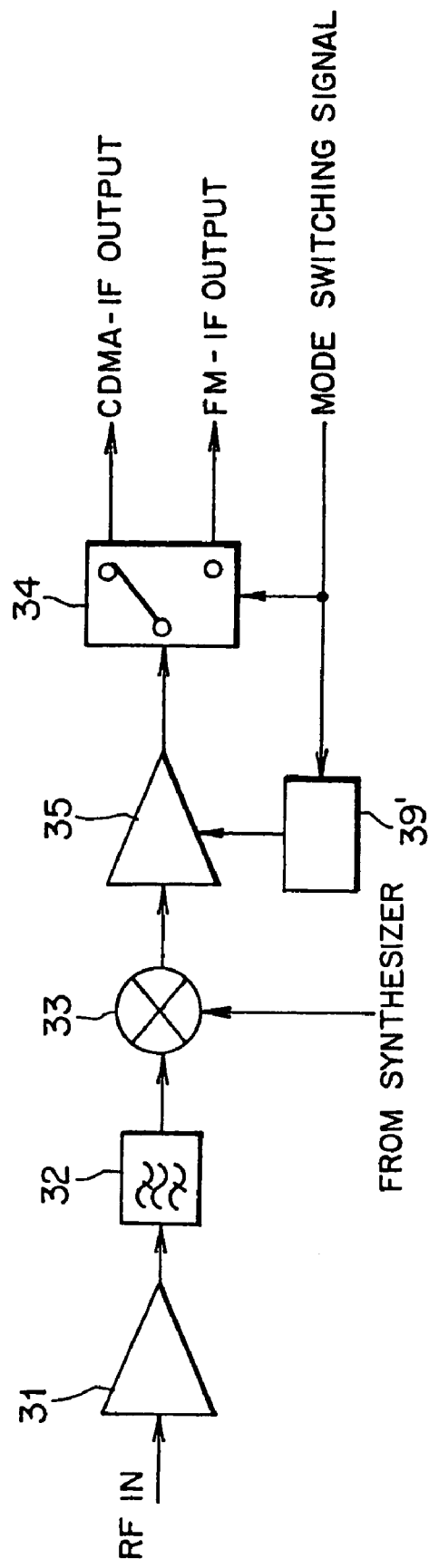
FIG. 6 is a block diagram illustrating a construction of the portable radio mobile terminal according to the second embodiment with special attention focused on the receiving system thereof.

That is, in the portable radio mobile terminal 1' according to the second embodiment of the invention (hereinafter, sometimes referred to simply as "terminal 1'" or "dual mode terminal 1'"), the switch 34 is provided at the rear stage of the IF amplifier 35 so as to divide the rear stage of the IF amplifier 35 into two demodulating systems 40A and 40B. Incidentally, other components (assigned with the same signs as in FIG. 1) are respectively the same as those described with reference to FIG. 1. Further, FIG. 6 is a block diagram illustrating the construction of this terminal 1' with special attention focused on its receiving system (receiving front end) 3.

Here, the foregoing IF amplifier 35 is one adapted for IF band for amplifying the IF band radio signal (received IF signal) after the RF band radio signal is down-converted as the received signal by means of the mixer 33, and in this second embodiment, a bias adjusting circuit 39' is controlled according to the CDMA and FM modes (mode switching signal from the CPU 9) so that its operating condition may be changed into one according to the CDMA or FM mode.

That is, in the dual mode terminal 1' of this embodiment, at the receiving front end 3, the amplifier 35 for amplifying the received signal which is shared between each radio communication system is provided while the CPU 9 serves as a control portion (bias changing control portion) for changing the operating condition (bias current amount) of this amplifier 35 into one (bias current amount) according to the radio communication system of the received signal.

To be concrete, during the CDMA mode, the foregoing operating condition is changed into the CDMA bias current amount (first current amount) which satisfies the IIP3 required of the CDMA system while, during the FM mode, it is changed into the FM bias current (second bias current amount) which satisfies the IIP3 required of the FM system. However, also in this embodiment, since the IIP3 required of the CDMA system is higher than that required of the FM system, the CDMA bias current is made greater than the FM bias current.

Figure 7:
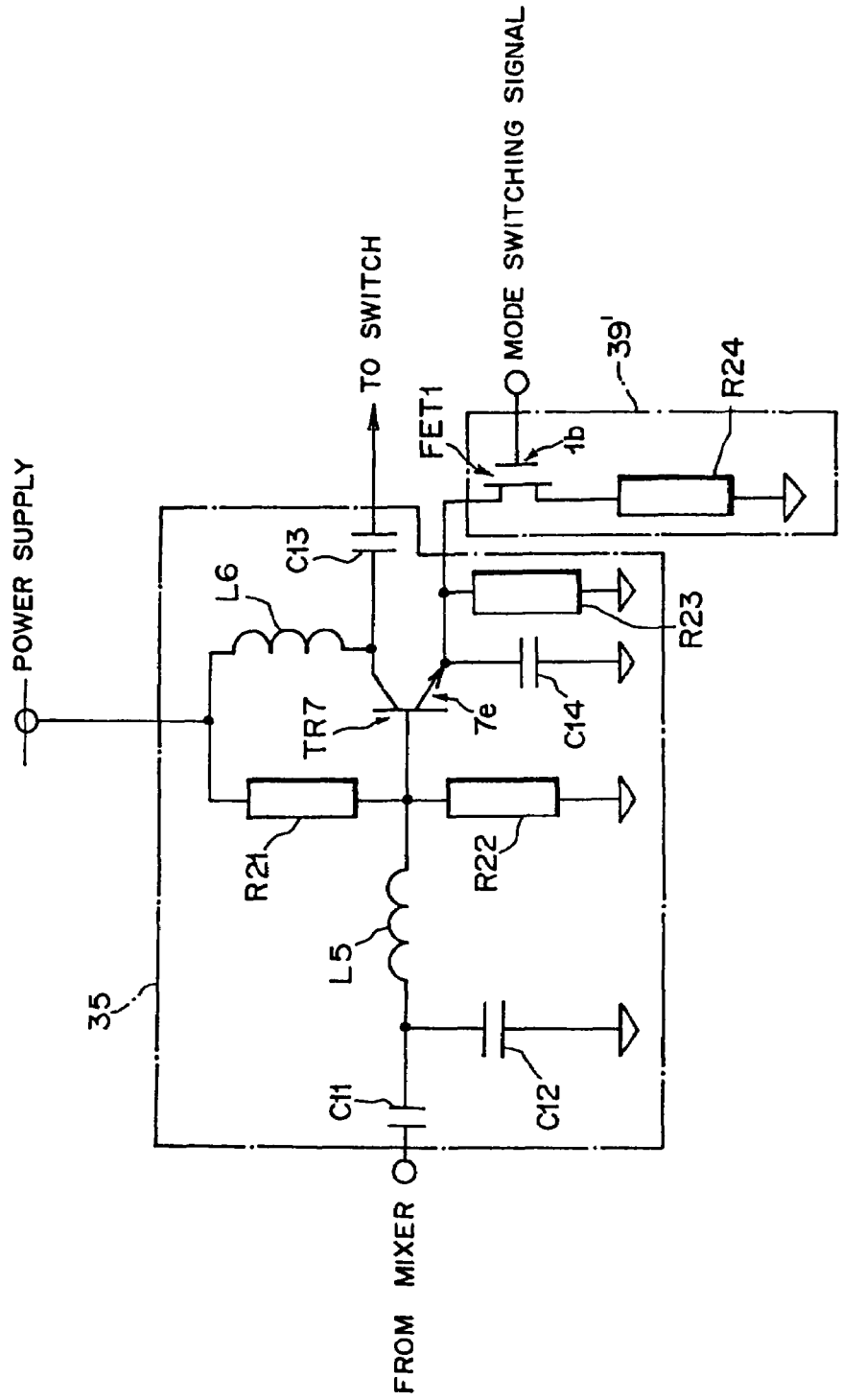
FIG. 7 is a circuit diagram schematically illustrating a detailed construction of an IF amplifier and a bias adjusting circuit in the receiving system of the second embodiment.
Figure 8A:
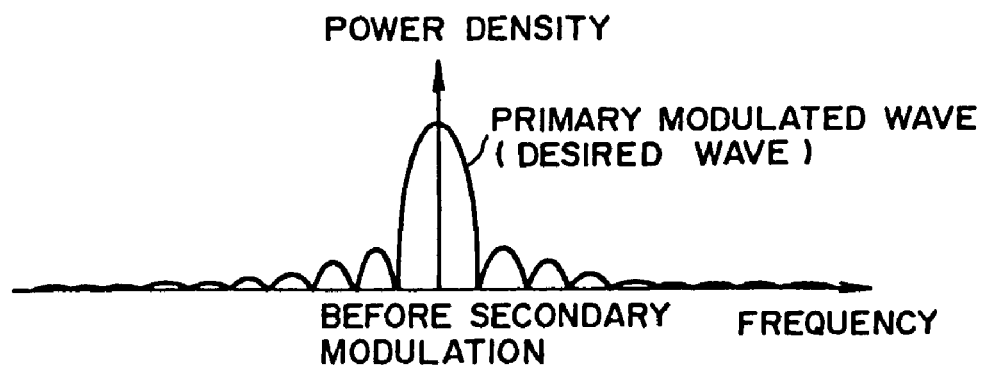
FIGS. 8(*a*) and 8(*b*) are respectively a view for explaining the CDMA system.
Figure 8B:
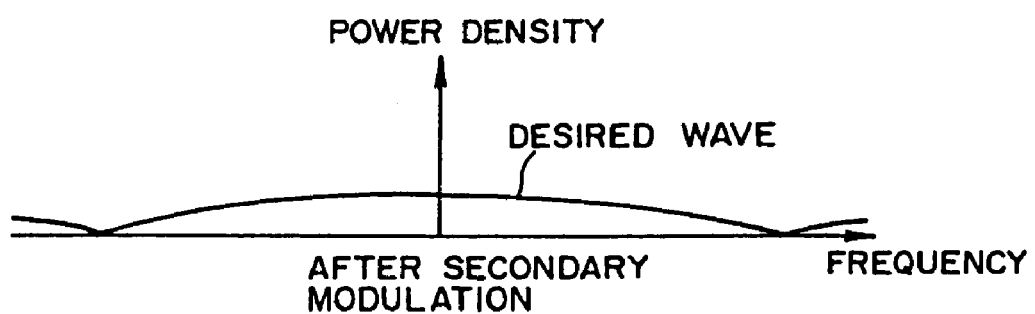

Also in this case, the method of adjusting the bias current amount is not specifically called into question, but in this second embodiment, as shown in, for example, FIG. 7, the IF amplifier 35 is constructed with a bipolar transistor TR7, resistances R21 to R23, capacitors C11 to C14 while the bias adjusting circuit 39' is constructed with a field-effect transistor FET1 and a resistance R24 so that the resistance R23 and the resistance R24 are connected in parallel at least to an emitter 7e of the transistor TR7 via the transistor FET1. The mode switching signal (H level) generated at the CPU 9 is entered to a base 1b of the transistor FET1.

With such a construction, during the CDMA mode, if the CDMA mode switching signal (H level) is inputted to the base 1b of the transistor FET1, then the transistor FET1 operates (turned on), and the resistance R23 of the IF amplifier 35 and the resistance R24 of the bias adjusting circuit 39' are connected in parallel.

As a result, the total resistance value connected to the emitter 7e of the transistor TR7 becomes small, and the current amount (that is, CDMA bias current amount) which flows through the emitter 7e becomes greater during the CDMA mode than during the FM mode. Incidentally, during the FM mode, since the transistor FET1 does not operate, the current amount depending only on the value of the resistance R23 (that is, FM bias current amount) flows through the emitter 7e of the transistor of the transistor TR7.

Therefore, in this embodiment, it is enough to set the value of the resistance R23 to the value which satisfies the IIP3 according to the FM system while setting the resistance value as the R23 and R24 are connected in parallel to the value which satisfies the IIP3 according to the CDMA system so that, with a simple construction, the operating condition of the IF amplifier 35 can be changed according to the radio communication system of the received signal.

With such a construction, also in the dual mode terminal 1' of the second embodiment (see FIG. 4), as with the above-described procedure of the first embodiment, if it is encompassed within the CDMA service area, then it is turned into a waiting state under the CDMA mode, and the CPU 9 generates a CDMA mode switching signal (H level) to supply to the switch 34 and the bias adjusting circuit 39' respectively.

Thus, the transistor FET1 of the bias adjusting circuit 39' operates (turned on), and the resistance R23 of the IF amplifier 35 and the resistance R24 of the bias adjusting circuit 39' are connected in parallel with the result that the CDMA bias current amount flows through the emitter 7e of the transistor TR7. As a result, if the IF amplifier 35 receives the CDMA communication signal, then it operates under the operating condition optimal to amplify that signal.

On the other hand, when the terminal 1' is powered on, if it is encompassed within the FM service area, then it turns into a waiting state under the FM mode, and the CPU 9 generates the FM mode switching signal (L level) to supply to the switch 34 and the bias adjusting circuit 39' respectively.

By this, since the transistor FET1 of the bias adjusting circuit 39' turns into the non-operative (OFF) state, the resistance R24 of the bias adjusting circuit 39' becomes disconnected state from the emitter 7e of the transistor TR7, to which the FM bias current amount flows. As a result, the IF amplifier 35, if it receives the FM communication signal, operates under the condition optimal to amplify that signal.

That is, the dual mode terminal 1' according to this embodiment changes the operating condition of the amplifier 35 for amplifying the received signal into one according to the radio communication system of the received signal to amplify the received signal.

Consequently, it is not necessary to provide plural types of amplifiers according to the CDMA and TACS communication systems, as in the first embodiment, and while achieving simplification of the entire terminal 1', it becomes possible to make the amplifier 35 operate under the condition optimal to each communication system to amplify the received signal. In this case, since the amplifier 35 is made to operate with the bias current amount optimal to each radio communication system, the power consumption of this terminal 1' is greatly reduced as compared with a case in which, as described above with reference to FIG. 9, the amplifier 105 is shared between each communication system to make its bias current amount remain adjusted with a large margin in accordance with the CDMA system having a high IIP3.

Further, also in this embodiment, when the terminal 1 is powered on, the CPU 9 detects which one of the CDMA and TACS systems the radio communication system of the received signal is and generates a mode switching signal according to that detection result to supply to the switch 34 and the bias adjusting circuit 39'. In consequence, the bias adjustment of the IF amplifier 35 is automatically achieved lending itself greatly to the improvement of usability of this terminal 1.

Still further, in this embodiment, since the amplifier 35 is the IF amplifier 35 for IF band and the RF stage to IF amplifier 35 are shared in common to each radio communication system, the terminal 1' can be made further smaller as compared with the terminal 1 of the first embodiment.

Incidentally, also in the foregoing second embodiment, although a case in which two types of radio communication systems (CDMA and TACS (FM)) are applied has been described with reference to the plural types of radio communication systems, the present invention is not restricted to it, but ones other than the foregoing (for instance, TDMA system or the like) may be applied, or three or more types of radio communication systems may be applied.

Further, although, in the foregoing second embodiment, the switch 34 is provided at the rear stage of the IF stage IF amplifier 35, the switch 34 may also be provided at the rear stage of LNA 31 so that the bias adjustment is controlled over the LNA 31 at the RF stage. However, also in this case, as described above with reference to the first embodiment, since the circuit size is increased, it is not suitable to apply to the portable mobile terminal 1'.

Further, as in the second embodiment, when the terminal is turned on, the CPU 9 discriminates between the CDMA and TACS systems to automatically switch between the CDMA and TACS modes. However, this switching can also be carried out manually by users. Still further, also with the CPU 9 of this terminal 1', it may also give priority to the detection of reception of the TACS system signal (detection of service area) rather than that of CDMA system. In the foregoing embodiments, although a case in which the present invention is applied to a portable radio mobile terminal was described, the present invention is not restricted to it, but may be applied to any apparatus, for example, a fixed station if it has a radio receiving function. The present invention is not restricted to the foregoing first and second embodiments, but may be subjected to various changes and modifications without departing from its scope and spirit.

What is claimed is:

1. A radio receiver comprising:
 a receiving system for receiving a radio signal according to plural types of radio communication modes, each radio communication mode dealing with a radio signal having a different power-density spectrum, said receiving system comprising:
  plural types of amplifiers, each of which corresponds to one of said radio communication modes, each amplifier amplifying a received signal according to said corresponding radio communication mode, and having a transistor and a resistance connected to an emitter of the transistor, and each of the resistances has a different resistance value,
  a control unit which selects, based on a radio signal that has been actually received, a waiting mode corresponding to one of said plural types of radio communication modes, and uses an amplifier from said plural types of amplifiers, said amplifier corresponding to the selected waiting mode corresponding to said one of said plural types of radio communication modes, and
  a bias current controlling unit controlling a plurality of bias currents, each of the bias currents being provided for a corresponding amplifier when said control unit performs the selecting of the respective waiting mode, each of the bias currents being different from each other bias current due to a difference of the resistance values.

2. The radio receiver as set forth in claim 1, wherein a selection control portion is provided to select an amplifier to be used according to said radio communication system of the received signal.

3. The radio receiver as set forth in claim 2, wherein
said receiving system comprises an output selection portion for outputting said received signal to one of said amplifiers according to said radio communication mode; and
said selection control portion is constructed so as to control the selecting process of said output selection portion and to make one of said amplifiers operate according to the radio communication mode of said received signal.

4. the radio receiver as set forth in claim 3, wherein
said output selection portion is provided at an intermediate frequency stage where a radio signal of intermediate frequency band after a radio signal of radio frequency band is down-converted is entered as said received signal; and
said amplifiers are each constructed as one adapted for intermediate frequency band which amplifies said radio signal of intermediate frequency band.

5. The radio receiver as set forth in claim 4, wherein
said plural types of radio communication modes comprise a first communication mode and a second communication mode whose permissible noise signal levels differ from each other, a noise signal being caused to the received signal of itself due to that of the other radio communication mode which differs from the former;
said plural types of amplifiers each comprises a first amplifier adapted for said first communication mode and a second amplifier adapted for said second communication mode, said first and second amplifiers being each set with a different bias current amount so as to each achieve an operating condition meeting said permissible noise signal level;
said output selection portion being constructed as a distributing switch for distributing said received signal to one of said first and second amplifiers; and
said selection control portion being constructed as a switching control portion for switching the output of said distributing switch to one of said first and second amplifiers according to the radio communication mode of said received signal and actuating corresponding one of said first and second amplifiers.

6. The radio receiver as set forth in claim 5, wherein said switching control portion comprises:
a communication mode detecting portion for detecting which one of said first and second communication modes is the radio communication mode of said received signal, wherein if said first communication mode is detected at said communication mode detecting portion, the output of said distributing switch is switched to said first amplifier side and said first amplifier is actuated while, if said second communication mode is detected at said communication mode detecting portion, the output of said distributing switch is switched to said second amplifier side and said second amplifier is actuated.

7. The radio receiver as set forth in claim 6, wherein said second communication mode is an analog radio communication mode utilizing a desired modulating system and said first communication mode is a digital radio communication mode utilizing a spread spectrum system and whose permissible noise signal level is lower than that of said analog radio communication mode.

8. The radio receiver as set forth in claim 7, wherein the bias current amount of said first amplifier is set greater than that of said second amplifier.

9. The radio receiver as set forth in claim 5, wherein said second communication mode is an analog radio communication mode utilizing a desired modulating system and said first communication mode is a digital radio communication mode utilizing a spread spectrum system whose permissible noise signal level is lower than that of said analog radio communication mode.

10. The radio receiver as set forth in claim 9, wherein the bias current amount of said first amplifier is set greater than that of said second amplifier.

11. The radio receiver as set forth in claim 3, wherein
said plural types of radio communication modes comprise a first communication mode and a second communication mode whose permissible noise signal levels differ from each other, a noise signal being caused to the received signal of itself due to that of the other radio communication mode which differs from the former;
said plural types of amplifiers each comprises a first amplifier adapted for said first communication mode and a second amplifier adapted for said second communication mode, said first and second amplifiers being each set with a different bias current amount so as to each achieve an operating condition meeting said permissible noise signal level;
said output selection portion being constructed as a distributing switch for distributing said received signal to one of said first and second amplifiers; and
said selection control portion being constructed as a switching control portion for switching the output of said distributing switch to one of said first and second amplifiers according to the radio communication mode of said received signal and actuating corresponding one of said first and second amplifiers.

12. The radio receiver as set forth in claim 11, wherein said switching control portion comprises:
a communication mode detecting portion for detecting which one of said first and second communication modes the radio communication system of said received signal, wherein if said first communication mode is detected at said communication mode detecting portion, the output of said distributing switch is switched to said first amplifier side and said first amplifier is actuated while, if said second communication mode is detected at said communication mode detecting portion, the output of said distributing switch is switched to said second amplifier side and said second amplifier is actuated.

13. The radio receiver as set forth in claim 12, wherein said second communication mode is an analog radio communication mode utilizing a desired modulating system and said first communication mode is a digital radio communication mode utilizing a spread spectrum system and whose permissible noise signal level is lower than that of said analog radio communication mode.

14. The radio receiver as set forth in claim 13, wherein the bias current amount of said first amplifier is set greater than that of said second amplifier.

15. The radio receiver as set forth in claim 11, wherein said second communication mode is an analog radio communication mode utilizing a desired modulating system and said first communication mode is a digital radio communication mode utilizing a spread spectrum system and whose permissible noise signal level is lower than that of said analog radio communication mode.

16. The radio receiver as set forth in claim 15, wherein the bias current amount of said first amplifier is set greater than that of said second amplifier.

17. A signal amplifying method in a radio receiver for receiving a radio signal according to plural types of radio communication modes, each radio communication mode dealing with a radio signal having a different power-density spectrum, comprising the steps of:

selecting by a control unit, based on a radio signal that has been actually received, a waiting mode corresponding to one of said plural types of radio communication modes;

selecting by said control unit one of plural types of amplifiers, each of which corresponds to one of said radio communication modes, said selected amplifier corresponding to the selected waiting mode which in turn corresponds to said one of said plural types of radio communication modes, and having a transistor and a resistance connected to an emitter of the transistor, and each of the resistances has a different resistance value;

amplifying the received signal using only the selected amplifier of said plural types of amplifiers; and controlling a plurality of bias currents, each of the bias currents being provided for a corresponding amplifier when said control unit performs the selecting of the respective waiting mode, each of the bias currents being different from each other bias current due to a difference of the resistance values.

* * * * *